United States Patent [19]

Ross

[11] 3,744,221
[45] July 10, 1973

[54] EXHAUST CLEANER

[76] Inventor: Samuel Scott Ross, 1570 Sunset Strip, Mountain Home, Idaho 83647

[22] Filed: Nov. 26, 1971

[21] Appl. No.: 202,291

[52] U.S. Cl............................ 55/263, 34/79, 34/131, 55/319, 55/323, 55/446, 261/79 A, 432/106
[51] Int. Cl............................................. B01d 50/00
[58] Field of Search ..................... 55/1, 80, 83, 89, 55/92, 93, 94, 96, 220, 235–238, 263, 260, 321, 319, 325, 323, 444–446; 261/17, DIG. 9, 79 A; 34/79, 131; 209/138, 139; 432/106

[56] References Cited
UNITED STATES PATENTS

| 843,783 | 2/1907 | Wilson | 209/139 R |
|---|---|---|---|
| 1,734,677 | 11/1929 | Kreisinger | 261/79 A |
| 2,715,283 | 8/1965 | Halldorsson | 34/79 |
| 2,817,415 | 12/1957 | Sykes | 261/79 A |

FOREIGN PATENTS OR APPLICATIONS

| 14,869 | 1905 | Great Britain | 55/238 |

*Primary Examiner*—Bernard Nozick
*Attorney*—John W. Kraft

[57] ABSTRACT

The exhaust cleaner of this invention generally comprises a baffle precleaner and a steam scrubber. The baffle precleaner comprises upstanding cylindrical walls, an enclosure wall fastened at the uppermost terminal end of the cylindrical walls, and downwardly projecting cone-shaped walls fastened at the lowermost terminal end of the cylindrical walls. The baffle precleaner is provided with a baffle filter at the lowermost terminal end of its cylindrical walls, and a plurality of filter screens distally disposed at intervals in alternatingly opposingly mounted fashion on the cylindrical walls of the baffle filter. The baffle precleaner is provided with a duct and blower means at the lowermost terminal end of the cone-shaped walls, which are operable to return heated separated gasses to the source of gasses. The scrubber is in communication with the baffle precleaner by means of the duct which is disposed at a tangent to the steam scrubber. The steam scrubber includes upstandingly disposed cylindrical walls, a flat horizontally disposed enclosure wall fastened to the uppermost terminal end of the cylindrical walls, and downwardly projecting substantially cone-shaped walls fastened at the lowermost terminal end of the cylindrical walls. The scrubber is provided with a dependingly mounted steam conduit supplied with steam under pressure from a suitable source. A steam conduit includes a plurality of suitably disposed exitways. The steam scrubber is provided with an exitway through which condensed water and steam is discharged at the lowermost terminal end of the cone-shaped walls, and is provided with a heat exhaust conduit discharging means operable to discharge heat and the like into a suitable exhaust stack.

6 Claims, 8 Drawing Figures

SAMUEL S. ROSS INVENTOR.

SAMUEL S. ROSS INVENTOR.
BY

PATENTED JUL 10 1973 3,744,221

SAMUEL S. ROSS   INVENTOR.

BY

EXHAUST CLEANER

FIELD OF INVENTION

The present invention relates to gas separators, and more particularly to gas separators operable to separate particulate matter carried in gasses.

DESCRIPTION OF THE PRIOR ART

Exhaust cleaners intended to separate particulate aerosols include cyclone separators and scrubber separators. Cyclone separators have cylindrical, or substantially cone-shaped, sidewalls. Particulate matter is separated by contacting particular aerosols with the walls of the cyclone. Particulate-bearing gasses may enter from one of the terminal ends of, or at a tangent to, the sidewalls of the cyclone. Cyclones having gasses entering at a tangent are generally more efficient than the end-inputting types because the particulate matter travels over a larger wall surface area. The efficiency of a simple cyclone is limited because the potential surface area with which particles contact is only the interior surface area of the cyclone walls.

Scrubbers may be conveniently divided into sprayers and impingers. Sprayers dispense liquid droplets as aerosols into the separator space. Particulate matter is separated from the gasses by contacting particulate aerosols with liquid droplets in the separator. The sprayer principle is limited by the number of particles which may be contacted by the sprayed liquid droplets. Impingers generally include a body of liquid through which particulate-bearing gasses are forced. To be effective, liquid must contact each particle carried in the gasses. Frequently, however, particles may escape as a result of encapsulation by the gasses.

Exhaust cleaners employing cyclone separators or scrubber separators generally exhaust a large proportion of the separated gas into the atmosphere. Frequently, in the case of dryers for example, heat energy is wasted by exhausting gasses into the atmosphere.

Accordingly, it is an object of the present invention to provide exhaust cleaner means which are operable to separate particulate matter borne in gasses and which may employ a cyclone provided with filter means to increase potential particle-contacting area.

It is a further object of this invention to provide exhaust cleaner means which may include a scrubber employing liquid vapor dispensing means to provide maximum saturation to separate extremely small particulate aerosols.

It is another object of this invention to provide exhaust cleaner means which may return a proportion of heated gasses to the heating source, such as a dryer.

These and other objects shall become apparent from the description following, it being understood that modifications may be made without affecting the teachings of the invention here set out.

SUMMARY OF THE INVENTION

Generally, the exhaust cleaner of this invention comprises a baffle precleaner and a steam scrubber. The baffle precleaner comprises upstanding cylindrical walls, an enclosure wall fastened at the uppermost terminal end of the cylindrical walls, and downwardly projecting cone-shaped walls fastened at the lowermost terminal end of the cylindrical walls. The baffle precleaner is provided with a baffle filter at the lowermost terminal end of its cylindrical walls, and a plurality of filter screens distally disposed at intervals in alternatingly opposingly mounted fashion on the cylindrical walls of the baffle filter. The baffle precleaner is provided with a duct and blower means at the lowermost terminal end of the cone-shaped walls, which are operable to return heated separated gasses to the source of gasses. The scrubber is in communication with the baffle precleaner by means of the duct which is disposed at a tangent to the steam scrubber. The steam scrubber includes upstandingly disposed cylindrical walls, a flat horizontally disposed enclosure wall fastened to the uppermost terminal end of the cylindrical walls, and downwardly projecting substantially cone-shaped walls fastened at the lowermost terminal end of the cylindrical walls. The scrubber is provided with a dependingly mounted steam conduit supplied with steam under pressure from a suitable source. A steam conduit includes a plurality of suitably disposed exitways. The steam scrubber is provided with an exitway through which condensed water and steam is discharged at the lowermost terminal end of the cone-shaped walls, and is provided with at heat exhaust conduit discharging means operable to discharge heat and the like into a suitable exhaust stack.

A more thorough and comprehensiv understanding may be had from the detailed description of the preferred embodiment when read in connection with the drawings forming a part of this specification.

DETAILED DESCRIPTION OF THE PREFERRED EMBODIMENT

Figure 1:
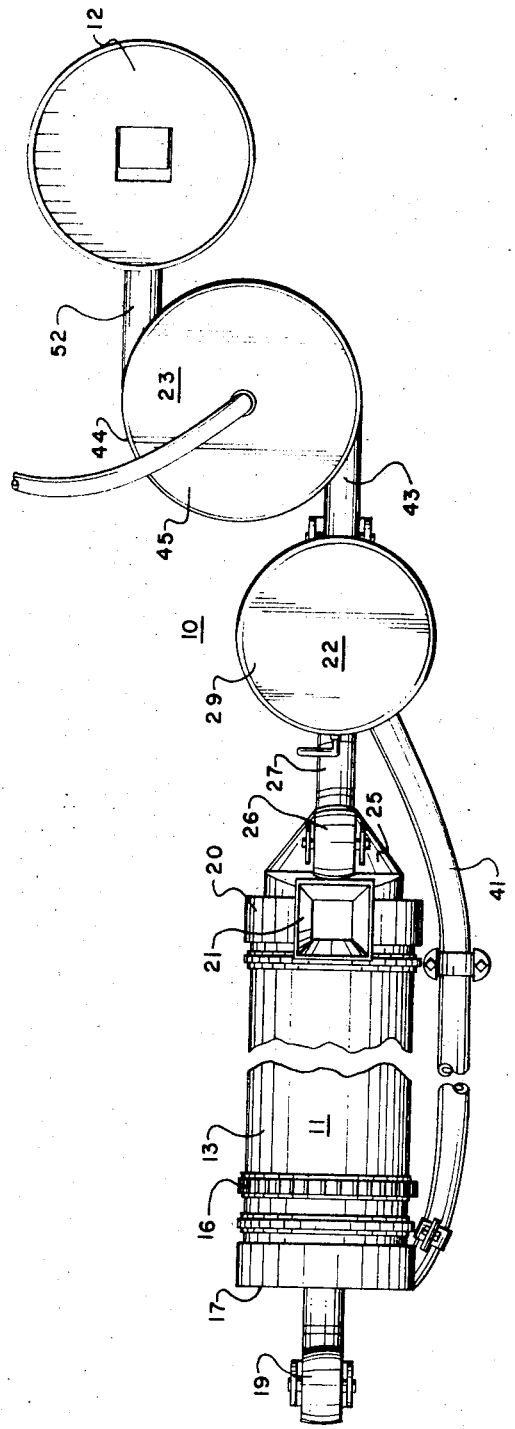
FIG. 1 is a top plan view of the exhaust cleaner of the present invention with a dryer shown for illustrative purposes.

Referring now to the drawings, and more particularly to the FIG. 1, the exhaust cleaner of this invention is shown to advantage and identified by the numeral 10.

The exhaust cleaner 10 is intended to be employed in combination with a rotary dryer 11 and to be disposed between the dryer 11 and an exhaust stack 12. As shown more clearly in the FIG. 2, the rotary dryer 11 commonly comprises a horizontally disposed cylindrical drum 13 journaled for rotation on suitable dryer pedestals 14. The dryer 11 is rotated by a motor 15 in cooperation with a girth gear 16 disposed about the outer circumference of the drum 13. The drum 13 is closed at one of its terminal ends by a fixedly mounted end portion 17. The end portion 17 is fastened to one of the pedestals 14 and journaled for rotation within the drum 13. The end portion 17 is provided at its lowermost terminal side with a product output discharging chute 18. The end portion 17 may be provided at its terminal end with a heated blower 19. The drum 13 is closed at its end opposite with an end portion 20. The end portion 20, in a like manner to the end portion 17, is fixedly mounted to one of the pedestals 14 and is journaled for rotation within the drum 13. The end portion 20 is provided at its uppermost terminal side with a product input hopper 21. The drum 13 may be provided with a product urging means (not shown), such as spiral blades, disposed about the interior walls of the drum 13. In operation, heated gasses are moved by the blower 19 from the end portion 17 toward the end portion 20 while the product is moved in the opposite direction.

The exhaust cleaner 10 comprises a baffle precleaner 22 and a steam scrubber 23. The exhaust cleaner 10 is connected to the gas discharging end portion 20 by means of a gas conducting duct 24. The end portion 20 includes an endwall 25 which is inclined upwardly at an acute angle to the vertical axis of the dryer 11. The endwall 25 is disposed in an acute angle to provide back pressure to the dryer 11. The duct 24 is a substantially cylindrical tube disposed horizontally and substantially parallel to the uppermost terminal side of the drum 13. A blower 26 is connected by a Y-pants duct means 27 to the duct 24. The blower 26 is directed away from the dryer 11, and is operable to balance the flow of gasses in the dryer 11 and to force gasses through the duct 24. The duct 24 is fastened to the baffle precleaner 22 at its sidewall 28 distally from lowermost terminal end.

The baffle cleaner 22 is an upstanding, substantially cylindrical, container having sidewalls 28, a flat horizontally disposed enclosure wall 29 fastened to the uppermost terminal end of the sidewalls 28, and cone-shaped lower walls 30 inclined downwardly from the walls 28. The baffle precleaner 22 is disposed on a suitable pedestal 31.

Figure 6:
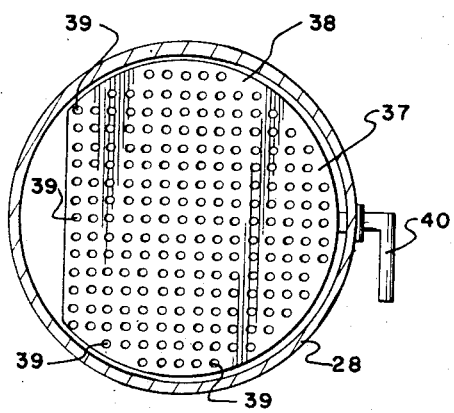
FIG. 6 is a cross-sectional view taken substantially along the lines 6—6 of the FIG. 2 and drawn to a larger scale showing the configuration of a typical filter of the baffle precleaner of this invention.

It is intended that the baffle precleaner 22 be operable to capture relatively larger particulate matter carried in the gasses from the dryer 11. The baffle precleaner 22 includes a baffle filter 32 disposed in the lowermost terminal end of the sidewalls 28 at the intersection of the walls 28 and 30. As shown more clearly in the FIG. 3, the baffle filter 32 may comprise a plate 33 of substantially the same size and configuration as the interior of the walls 28, and a multiplicity of holes 34 disposed in the plate 33. While the holes 34 are disposed in rectilinear ranks and transverse rows, other arrangements, such as concentric rows, are equally operable. As shown by the FIGS. 4 and 5, a further embodiment of the baffle filter 32 employs a multiplicity of vanes 35 disposed in ranks on a plate 36. The vanes include a horizontally disposed portion 35' and a downwardly curved portion 35''. In operation, particulate matter borne by the moving gasses in the precleaner 22 will tend to become lodged on the baffle filter 32. Referring again to the FIG. 2, the baffle precleaner 22 includes a plurality of grid-like filters or screens 37. The screens 37 are dependingly carried on the interior of the sidewalls 28 distally apart, and are alternately opposingly mounted to the interior of the walls 28. As shown more clearly in the FIG. 6, the filter screens 37 comprise a plate 38 and a multiplicity of holes 39. The plate 38 is substantially smaller than the interior of the walls 28. In practice, it has been found to advantage to remove a portion of the filters 37 across a cord on the side of the filter 37 opposite the filter mounting means. Each of the filters 37 is journaled for rotation in the walls 28 and is provided with filter actuating means 40 on the exterior of the walls 28. It is to be understood that the open areas between the filters 37 and the interior of the walls 28 facilitate upward area flow. In operation, the filters may be inverted in the tank, thus providing a means for efficiently utilizing both sides of the filter 37, and providing a means of clearing the filters 37. It has been found to advantage to provide relatively smaller holes in the filter 37 than are provided in the baffle filters 32.

Referring again to the FIG. 2, the lowermost terminal end of the cone-shaped walls 30 open into a duct 41. The duct 41 communicates the baffle precleaner 22 with the forward gas input portion of the dryer 11. In practice, it has been found to advantage to return to end portion 17 for reasons of duct linearity and distance. The duct is provided with pressure by means of a blower 42 which is directed toward the dryer 11. The blower 42 and the duct 41 may be supported by the respective pedestals 14 and 31. In operation, large particulate matter carried in the heated gasses from the dryer 11 enter the baffle precleaner 22. Very large particulate matter contacts the filters 37 and will tend to fall on the baffle filter 32. Smaller particulate matter will tend to be entrapped on the filters 37. Heated gasses and some particulate matter are drawn by the blower 42 through the duct 41, and are returned to the dryer 11. Smaller particulate matter, still carried in aerosol form, is conducted by a duct 43 into the steam scrubber 23.

Figure 2:
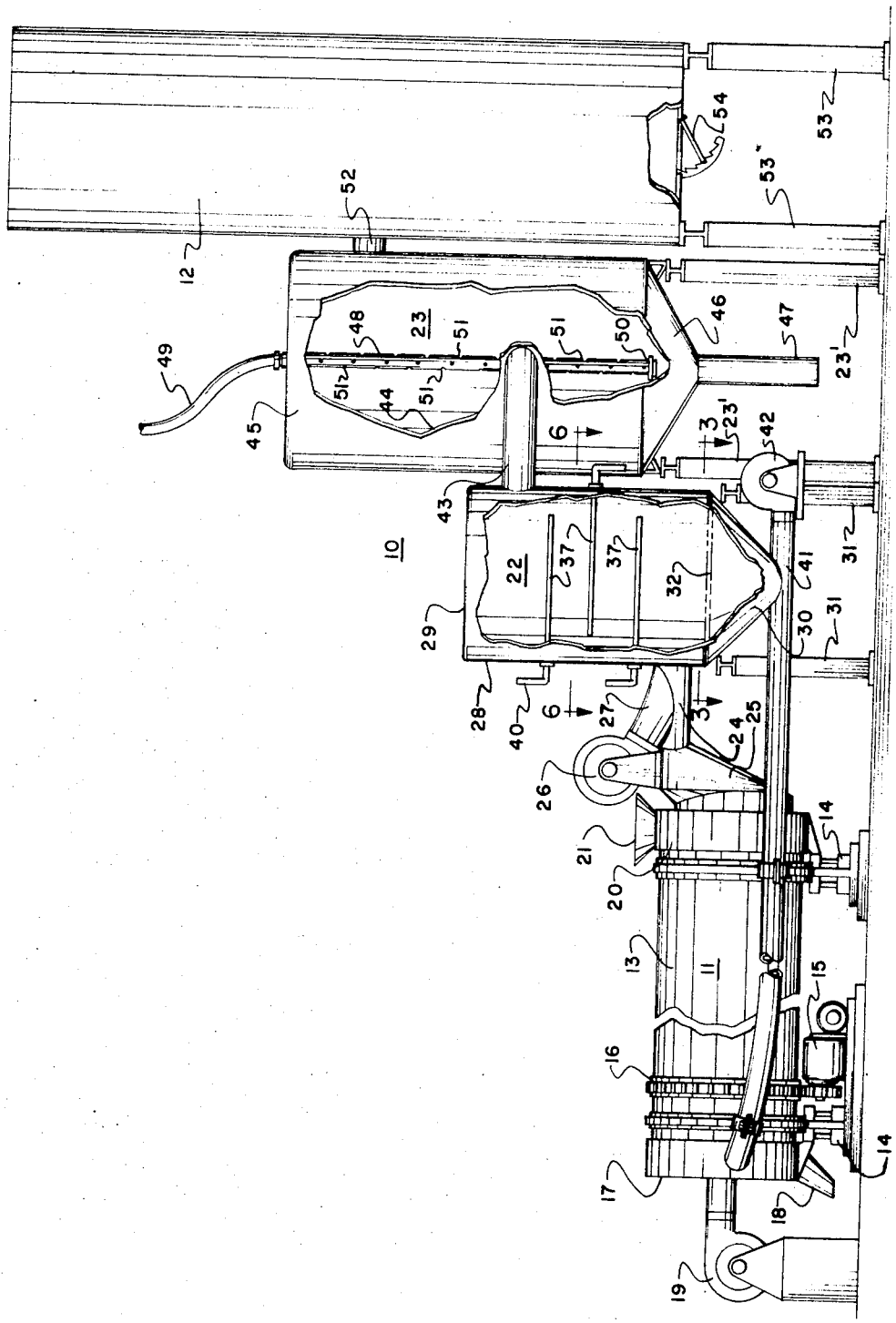
FIG. 2 is a side elevational view of the apparatus of the FIG. 1 with the walls of the baffle precleaner and the steam scrubber partially broken away to how the interior configuration thereof.
Figures 3, 4, 5:
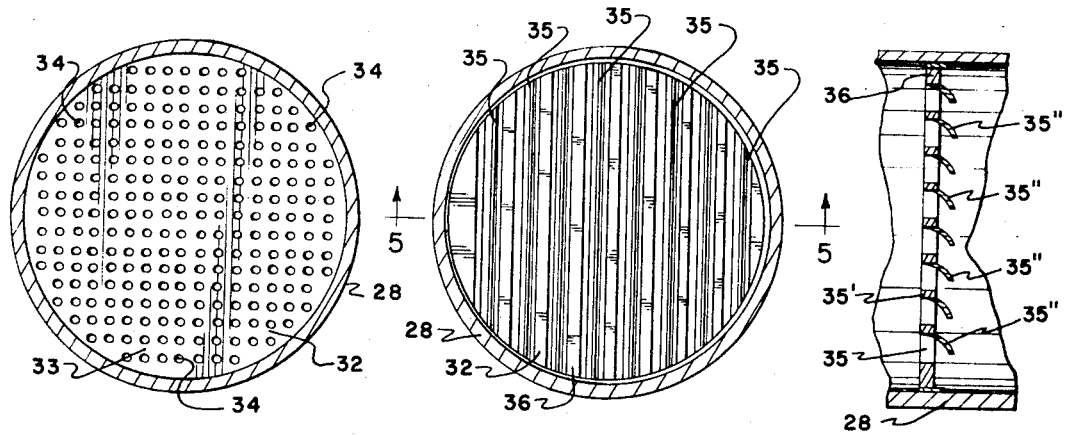
FIG. 3 is a cross-sectional view taken substantially along the lines 3—3 of the FIG. 2 and drawn to a larger scale showing a filter screen of the baffle precleaner.
FIG. 4 is a cross-sectional view taken substantially along the lines 3—3 of the FIG. 2 and drawn to a larger scale showing a further embodiment of the baffle filter of this invention.
FIG. 5 is a cross-sectional view of the apparatus of the FIG. 4 taken substantially along the lines 5—5 of the FIG. 4 showing the interior configuration of the further embodiment of the baffle filter of the baffle precleaner.
Figure 7:
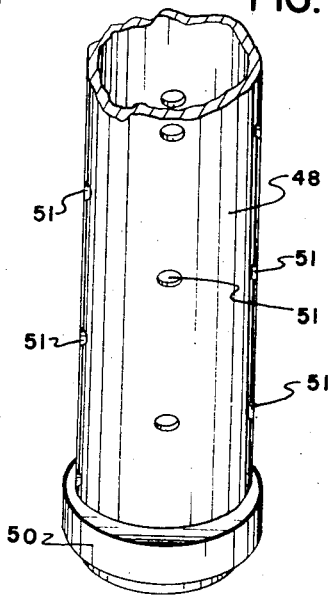
FIG. 7 is a fragmentary top perspective view of the steam conduit of the steam scrubber of this invention and showing the steam exitways disposed in spiral configuration in the conduit walls.
Figure 8:
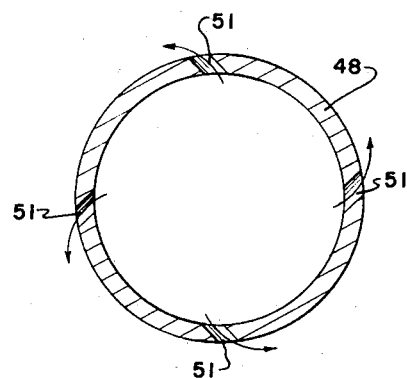
FIG. 8 is a diagrammatic view showing to advantage the interior configuration of the angularly disposed steam conduit exitways and shown with arrows indicating steam flow for illustrative purposes.

As shown by the FIGS. 1 and 2, the duct 43, which communicates the precleaner 22 with the scrubber 23, is substantially horizontally disposed with its axis from the center of the precleaner 22 to a tangent to one of the terminal sidewall 44 of the scrubber 23. As shown in the FIG. 2, the duct 43 is fastened distally from the uppermost terminal end of the walls 28 of the precleaner 22, and is fastened to the scrubber 23 midway in its sidewall 44. The steam scrubber 23 is an upstanding, substantially cylindrical container having cylnndrical sidewalls 44, a flat horizontally disposed enclosure wall 45 fastened to the uppermost terminal end of the walls 44, and cone-shaped lower walls 46 inclined downwardly from the walls 44. The lowermost terminal end of the cone-shaped walls 46 opens into a material discharging conduit 47 which empties into a suitable receptacle (not shown). The steam scrubber 23 is disposed on a suitable pedestal 23'. The steam scrubber 23 includes a centrally disposed steam conduit 48 dependingly carried from the uppermost enclosure wall 45. The steam conduit 48 is supplied with steam under pressure from a suitable source (not shown) through a conduit 49. The steam conduit 48 includes an end closure means, such as a plug 50, disposed at the end opposite the conduit engaging end, and a multiplicity of exitway holes 51. As shown more clearly in the FIG. 7, the exitways 51 are disposed on a conduit 48 at suitable intervals. It has been found to advantage to dispose the exitways 51 in a spiraling fashion to facilitate steam disbursion in the scrubber 23. As shown by the diagrammatic view in the FIG. 8, each of the exitways 51 is disposed in the conduit 48 in an angular fashion such that steam passing out of the conduit 48 through the exitways 51 will be carried in the directon of the centripetally moving gasses.

In operation, small particulate aerosols are introduced through the duct 43 to the steam scrubber 23. In the steam scrubber 23, the small particulate matter acts to form a nucleus about which water vapor may condense and be carried toward the bottom of the steam scrubber 23. Water condensed in the steam scrubber 23 is then carried out of the steam scrubber 23 through the conduit 47.

Heat and water vapor are carried from the steam scrubber 23 to an exhaust stack 12 by means of a duct 52. As shown by the FIG. 1, the duct 52 is disposed with its center axis tangent to the sidewalls 44 and toward the center of the exhaust stack 12. As shown by the FIG. 2, the duct 52 is fastened to the scrubber 23 distally from its uppermost terminal end and is fastened to the exhaust stack 12 distally from its lowermost terminal end. The stack 12 is disposed in a suitable pedestal 53 which is operable to provide an air space between the lowermost terminal end of the stack 12 and the ground. As shown by the FIGS. 1 and 2, the exhaust stack 12 is provided with a damper 54 which may be selectively controlled to control atmospheric pressure in the stack 12.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. An exhaust cleaner, comprising a baffle precleaner including upstanding cylindrical walls, a flat horizontally disposed enclosure wall fastened at the uppermost terminal end of said cylindrical walls, and downwardly projecting substantially cone-shaped walls fastened to the lowermost terminal end of said cylindrical walls, said baffle precleaner being connected to a suitable source of particulate-bearing gasses by means of a duct fastened distally from the lowermost terminal end of said cylindrical walls, and said baffle preclaner being connected to a steam scrubber by means of a suitable duct disposed distally from the uppermost terminal end of said cylindrical walls;

a baffle filter operable to separate large particulate matter carried in said source gasses, said baffle filter including a plate having an outer configuration similar to the interior configuration of said cylindrical walls, said baffle filter being disposed at the lowermost terminal end of said cylindrical walls;

a plurality of filter screens disposed at intervals in alternating opposing fashion to the interior of said cylindrical walls, said filter screens being substantially smaller than the interior of said cylindrical walls, said filter screens being operable to separate particulate matter carried in said source gasses;

means operable to draw separated gasses from said baffle precleaner, and means to return said separated gasses to said source of gasses which may be disposed at the lowermost terminal end of said cone-shaped walls;

a steam scrubber connected to said baffle precleaner by said conduit, said conduit being disposed at a tangent to said steam scrubber midway in its sidewall, said steam scrubber including upstanding cylindrical walls, a flat horizontally disposed enclosure wall fastened to the uppermost terminal end of said cylindrical walls, and downwardly projecting cone-shaped walls fastened to the lowermost terminal end of said cylindrical walls, said steam scrubber being provided with a condensate discharging conduit at the lowermost terminal end of said cone-shaped walls, said steam scrubber being connected to an exhaust stack by means such as a duct disposed distally from the uppermost terminal end of said steam scrubber cylindrical walls; and a steam conduit dependingly mounted from said steam scrubber enclosure wall, and closed on its end opposite said enclosure wall by a plug, and a multiplicity of suitably disposed exitways, said steam conduit being supplied with steam from a suitable source.

2. The apparatus of claim 1, wherein said baffle filter includes a multiplicity of holes suitably disposed in said baffle filter plate.

3. The apparatus of claim 1, wherein said baffle filter includes a multicity of vanes disposed in said plate.

4. The apparauts of claim 1, wherein said filter screens are journaled for rotation in said baffle precleaner cylindrical walls, said filter screens include actuator means operable to rotate said filter screens.

5. The apparatus of claim 1 including steam conduit exitways disposed in said steam conduit in a spiral configuration about the circumference of said conduit.

* * * * *